(12) United States Patent
Koseki et al.

(10) Patent No.: US 7,380,090 B2
(45) Date of Patent: May 27, 2008

(54) STORAGE DEVICE AND CONTROL METHOD FOR THE SAME

(75) Inventors: Hideyuki Koseki, Yokohama (JP); Junji Ogawa, Yokohama (JP); Yutaka Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 11/404,633

(22) Filed: Apr. 14, 2006

(65) Prior Publication Data

US 2007/0208910 A1    Sep. 6, 2007

(30) Foreign Application Priority Data

Mar. 3, 2006    (JP)    ............................. 2006-057242

(51) Int. Cl.
 *G06F 12/06* (2006.01)
(52) U.S. Cl. .................. 711/170; 711/202; 711/114
(58) Field of Classification Search ................ 711/114, 711/112, 170, 202, 203, 157; 714/6, 7
See application file for complete search history.

(56) References Cited

U.S. PATENT DOCUMENTS

| | | | |
|---|---|---|---|
| 6,516,380 B2 | 2/2003 | Kenchammana-Hoskote et al. | |
| 6,779,088 B1 * | 8/2004 | Benveniste et al. | 711/145 |
| 7,017,017 B2 * | 3/2006 | Dahlen et al. | 711/157 |
| 7,111,115 B2 * | 9/2006 | Peters et al. | 711/112 |
| 7,171,539 B2 * | 1/2007 | Mansell et al. | 711/203 |

OTHER PUBLICATIONS

Ganger, Gregory R., et al., "Disk Subsystem Load Balancing: Disk Striping vs. Conventional Data Placement", IEEE 1993, pp. 40-49.*
Ghandeharizadeh, Shahram, et al., "Continuous Retrieval of Multimedia Data Using Parallelism," IEEE Transactions on Knowledge and Data Engineering, vol. 3, No. 4, Aug. 1993, pp. 658-669.*

* cited by examiner

*Primary Examiner*—Pierre-Michel Bataille
(74) *Attorney, Agent, or Firm*—Sughrue Mion, PLLC

(57) ABSTRACT

A storage device according to the present invention has a first volume for storing discontinuous data transmitted from a host computer and a second volume for storing continuous data produced by address-converting discontinuous data, and includes: a data storing unit for converting the discontinuous data transmitted from the host computer into the continuous data and storing the continuous data in one of a plurality of third volumes formed by dividing up the second volume; a data management unit for managing transfer target data that has to be transferred from the third to the first volume, from among the discontinuous data stored in the third volume by the data storing unit; and a volume clearance unit for clearing the third volume having the smallest amount of transfer target data managed by the data management unit by transferring the transfer target data in the relevant third volume to the first volume.

12 Claims, 7 Drawing Sheets

1310

| VOLUME ID | VOLUME USAGE RATIO | CLEARANCE TARGET DATA RATIO | CLEARANCE TARGET DATA DECREASE RATIO | CLEARANCE TARGET FLAG | CLEARANCE PROCESSING START FLAG |
|---|---|---|---|---|---|
| 1311 | 1312 | 1313 | 1314 | 1315 | 1316 |
| 0 | 100% | 60% | 15% | ON | ON |
| 1 | 100% | 80% | 20% | OFF | |
| 2 | 100% | 85% | 8% | ON | |
| 3 | 100% | 90% | 3% | ON | |
| 4 | 80% | 100% | 0% | OFF | |

PRIMARY VOLUME ADDRESS MANAGEMENT TABLE (1321)

| LUN (1323) | HEAD LBA (1324) | END LBA (1325) |
|---|---|---|
| 0 | 00000010 | 00000020 |
| 3 | 00123004 | 00123036 |
| 2 | 00000466 | 00000476 |
| ... | ... | ... |
| ... | ... | ... |
| 6 | 00000100 | 00000400 |

LOG VOLUME ADDRESS MANAGEMENT TABLE (1322)

| LUN (1326) | HEAD LBA (1327) | END LBA (1328) |
|---|---|---|
| 100 | 00002000 | 00002010 |
| 100 | 00002010 | 00002042 |
| 100 | 00002042 | 00002050 |
| ... | ... | ... |
| ... | ... | ... |
| N/A | N/A | N/A |

FIG.3

| 1311 | 1312 | 1313 | 1314 | 1315 | 1316 |
|---|---|---|---|---|---|
| VOLUME ID | VOLUME USAGE RATIO | CLEARANCE TARGET DATA RATIO | CLEARANCE TARGET DATA DECREASE RATIO | CLEARANCE TARGET FLAG | CLEARANCE PROCESSING START FLAG |
| 0 | 100% | 60% | 15% | ON | ON |
| 1 | 100% | 80% | 20% | OFF | |
| 2 | 100% | 85% | 8% | ON | |
| 3 | 100% | 90% | 3% | ON | |
| 4 | 80% | 100% | 0% | OFF | |

1310

STORAGE DEVICE AND CONTROL METHOD FOR THE SAME

CROSS-REFERENCES TO RELATED APPLICATIONS

This application relates to and claims priority from Japanese Patent Application No. 2006-057242, filed on Mar. 3, 2006, the entire disclosure of which is incorporated herein by reference.

BACKGROUND OF THE INVENTION

The present invention relates to a storage device and control method for the storage device, and is particularly suited for use in a storage device that performs processing for writing discontinuous data to a physical disk.

Conventionally, data write processing to a physical disk in a storage device is largely divided into random write, i.e., processing for writing discontinuous data to a physical disk, and sequential write, i.e., processing for writing continuous data to a physical disk.

Because data transfer performance during sequential write is far greater than during random write in general, data writing to a physical disk can be performed at high speed during sequential write.

As a method for improving random write performance, data write processing in log format (hereinafter referred to as "log format-write"), in which discontinuous data is address-converted in a storage control unit in a storage device and the address-converted data is used as continuous data, has been proposed (see U.S. Pat. No. 6,516,380 B2). A storage device that employs log format-writing has a primary volume, which is a physical disk area for storing usual data, and a log volume for storing data with sequential-converted addresses.

However, the log volume is limited in log format-writing. Therefore, when the available log volume capacity becomes small, processing (hereinafter referred to as "log clearance processing") for clearing the log volume and address conversion table by transferring data in the log volume to the primary volume is necessary.

Moreover, when executing log clearance processing during log format-writing, random write based on data write to the primary volume, which is relevant to normal access to disks performed during non-log format-writing, is always necessary.

Accordingly, when executing log clearance processing in log format-writing, random write for clearing the log volume also has to be performed in the sequential write to the log volume. The random write processing efficiency is then reduced, which obstructs speeding up of the log format-writing.

SUMMARY OF THE INVENTION

An object of the present invention is to provide a storage device and control method for the storage device that can speed up data write processing for discontinuous data by converting the discontinuous data that is to be written into continuous data.

To achieve the above-stated object, the present invention provides a storage device having a first volume for storing discontinuous data transmitted from a host computer and a second volume for storing continuous data produced by address-converting the discontinuous data, the storage device including: a data storing unit for converting the discontinuous data transmitted from the host computer into continuous data and storing the address-converted data in one of a plurality of third volumes formed by dividing up the second volume; a data management unit for managing transfer target data, which is the data that has to be transferred from the third to the first volume, from among the continuous data stored in the third volumes by the data storing unit; and a volume clearance unit for clearing the third volume that contains the smallest amount of transfer target data managed by the data management unit by transferring the transfer target data in the relevant third volume to the first volume.

Accordingly, the total amount of discontinuous data and processing time in the processing for writing discontinuous data to the first volume that becomes necessary for clearing the second volume can be reduced, and the discontinuous data write efficiency can be improved.

The present invention also provides a control method for a storage device having a first volume for storing discontinuous data transmitted from a host computer and a second volume for storing continuous data produced by address-converting the discontinuous data, the control method including: a first step for converting the discontinuous data transmitted from the host computer into the continuous data and storing the address-converted data in one of a plurality of third volumes formed by dividing up the second volume; a second step for managing transfer target data, which is the data that has to be transferred from the third to the first volume, from among the continuous data stored in the third volume in the first step; and a third step for clearing the third volume that contains the smallest amount of transfer target data managed in the second step by transferring the transfer target data in the relevant third volume to the first volume.

Accordingly, the total amount of discontinuous data and processing time in the processing for writing discontinuous data to the first volume that becomes necessary for clearing the second volume can be reduced, and the discontinuous data write efficiency can be improved.

According to the present invention, discontinuous data transmitted from a host computer is converted into continuous data, and stored in one of a plurality of third volumes formed by dividing up a second volume; transfer target data that has to be transferred from the third volume to the first volume, from among the continuous data stored in the third volume in the first step, is managed; and the third volume is cleared by transferring the transfer target data in the third volume that contains the smallest amount of transfer target data managed in the second step from the third to the first volume. With this configuration, the total amount of discontinuous data and processing time in the processing for writing discontinuous data to the first volume that becomes necessary for clearing the second volume can be reduced, and the efficiency when writing discontinuous data to the first volume can be improved. By converting discontinuous data that is to be written into continuous data in the above described manner, a storage device and control method for the storage device that can speed up discontinuous data write processing can be realized.

BRIEF DESCRIPTION OF THE DRAWINGS

FIG. 2 is a conceptual view illustrating an address conversion table.

FIG. 3 is a conceptual view illustrating a log clearance timing management table.

DETAILED DESCRIPTION OF PREFERRED EMBODIMENTS

An embodiment of the present invention will be described with reference to the drawings.

Figure 1:
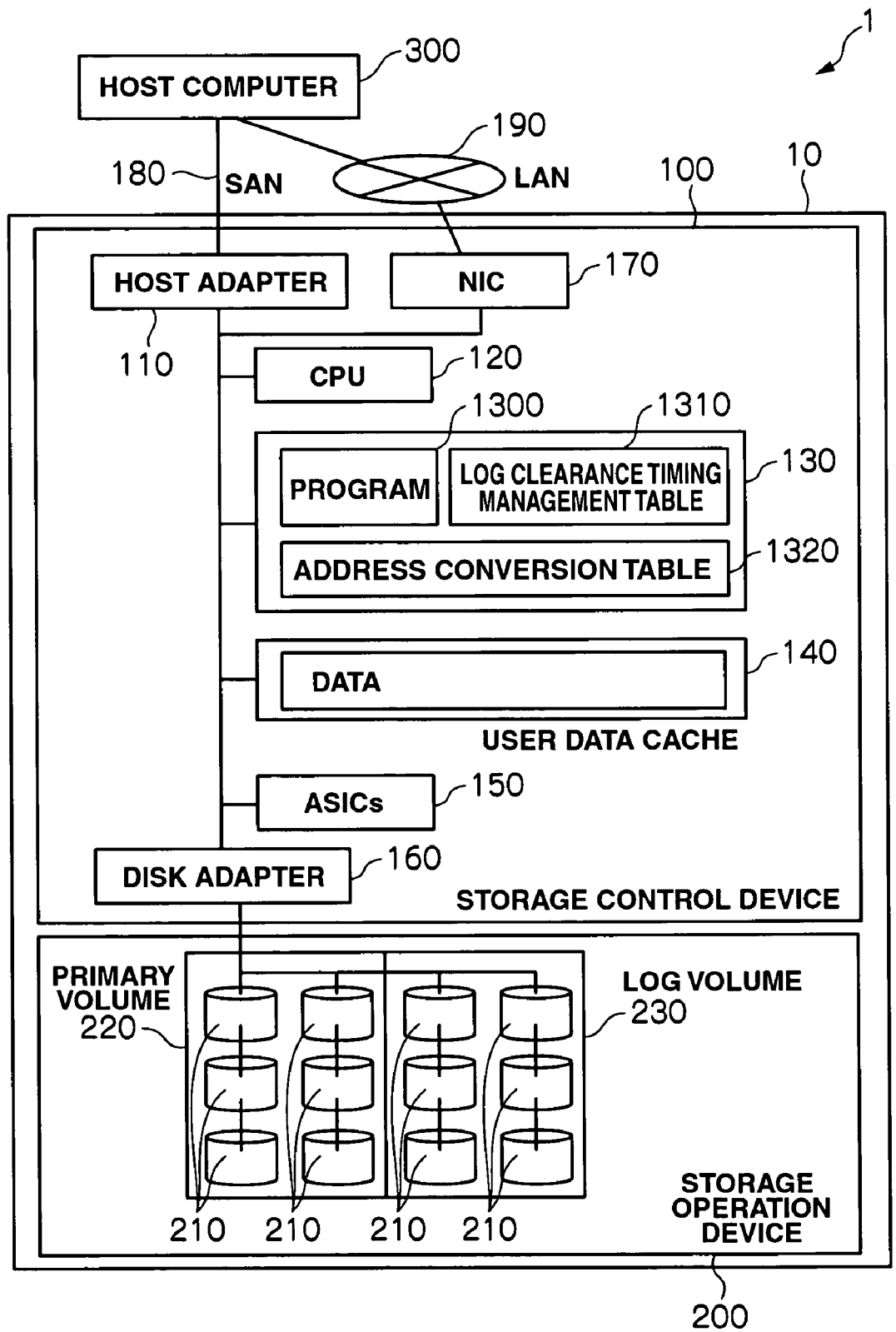
FIG. 1 is a schematic view showing the configuration of a storage system according to an embodiment of the present invention.

FIG. 1 shows the entire configuration of a storage system 1 according to an embodiment of the present invention. In FIG. 1, a storage device 10 includes a storage control device 100 that controls the entire storage device and a storage operation device 200 that provides storage areas. The storage device 10 is connected, via an HBA (Host Bus Adapter) 110 on the storage control device 100, to a host computer 300, such as an application server that uses the storage device 10. The host computer 300 has a microprocessor (not shown), memory (not shown), and communication interfaces (not shown).

A SAN (Storage Area Network) 180, being a dedicated network, is used as an interface for connection between the storage device 10 and the host computer 300. To establish the SAN 180, a fibre channel, SCSI (Small Computer System Interface), USB (Universal Serial Bus), or IEEE (Institute of Electrical and Electronic Engineers) 1394 bus may be used. A plurality of host computers 300 may be connected to the storage device 10.

Control software for operating and configuring the settings of the disks in the storage device 10 and controlling the operations of the storage device 10 is installed in the host computer 300. By the microprocessor in the host computer 300 executing the control software, the host computer 300 can issue commands to the storage device 10 to control the operations of the storage device 10. Data exchange is performed between the storage device 10 and the storage control software in the host computer 300 via a LAN (Local Area Network) 190 and an NIC (Network Interface Card) 170 in the storage device 10. Of course the storage device 10 may be managed and controlled by a host computer separate from the host computer 300.

The storage control apparatus 100 includes an HBA (Host Bus Adapter) 110 and NIC 170 for connection with the host computer 300 that uses the storage device 10, a central processing unit (hereinafter referred to as "CPU") that controls the entire storage device 10, memory 130 that stores programs and data necessary for the CPU 120 to control the storage device 10, a user data cache 140 that provides rapid response to data access from the host computer 300, ASICs (Application Specific Integratiod Circuits) 150 that performs parity calculations when configuring RAID (Redundant Arrays of Inexpensive Disks), and a disk adapter 160 that connects the storage control device 100 to the storage operation device 200.

The memory 130 contains programs 1300 that the CPU 120 uses to control the storage device 10, an address conversion table 1310 for address-converting discontinuous data into continuous data and managing data write positions in the log volume in the log format-writing, and a log clearance timing management table 1320 for monitoring the log volume usage ratio and clearance target data ratio and controlling start of the log clearance processing.

The storage operation device 200 includes a number of physical disks 210 (storage devices) that form a primary volume 220 (first volume) for storing discontinuous data and a log volume 230 (second volume) for storing continuous data produced by address-converting the discontinuous data. The primary volume 220 and log volume 230 are generally configured by one or more LUs (Logical Units) in RAID form containing the physical disks 210.

With that configuration, the storage device 10 can provide a large storage capacity to the host computer 300. Moreover, in the present invention the log volume 230 is managed by dividing it into a plurality of division log volumes (third volumes). When storing data in the log volume 230, if one division log volume is already filled with data at a particular moment, the next division log volume is used.

FIG. 2 shows the structure of the address conversion table 1320. The address conversion table 1320 manages the position in the log volume 230 where write data (discontinuous data) that is to be stored in the primary volume 220 is stored, and manages the addresses that data is sequentially written to when writing data in the log volume 230.

The address conversion table 1320 includes a primary volume address management table 1321 and log volume address management table 1322. The primary volume address management table 1321 manages addresses in the primary volume 220, which is a storage area recognized by the host computer 300. The log volume address management table 1322 manages addresses that have been address-converted for sequential write in the storage control device 100.

Each entry in the primary volume address management table 1321 has a corresponding entry in the log volume address management table 1322. When storing data in the primary volume 220, only the primary volume address management table 1321 is used and a value "N/A," which means no data stored, is input to corresponding entries in the log volume address management table 1322.

The primary volume address conversion table 1321 includes columns each storing target LUNs (Logical Unit Numbers) 1323, target LU head LBAs (Logical Block Addresses) 1324, and target LU end LBNs 1325. The log volume address management table 1322 includes columns each storing target LUNs 1326, target LU head LBAs 1327, and target LU end LBAs 1328.

When a target LUN 1326, target LU head LBA 1327, and target LU end LBA 1328 are added in the log volume address management table 1322, an address is allocated to data in the next command so that the head LBA for the next command becomes immediately after the end LBA for the previous command, and sequential write can be performed. When making data in the log volume 230 invalid, the value "N/A," indicating invalidity, is entered in relevant entries in the columns for the target LU 1326, target LU head LBA 1327, and target LU end LBA 1328.

The value "N/A," indicating invalidity, is also entered when a new volume is produced in primary volume 220 or log volume 230, or a primary volume 220 or log volume 230 is initialized, as a value indicating the initial state, in the relevant entries in the columns for target LUN 1323 and 1326, target LU head LBA 1324 and 1327, and target LU end LBA 1325 and 1328.

The primary volume address conversion table 1321 and log volume address conversion table 1322 may also include a column storing data length, as well as the above described columns for the target LUN 1323 and 1326, target LU head LBA 1324 and 1327, and target LU end LBA 1325 and 1328. The address conversion table 1320 may also have functions performing bitmap management on the primary volume address management table 1321 and sorting LUNs and LBAs to enable rapid search for data storage position.

FIG. 3 shows the structure of a log clearance timing management table 1310. A volume ID 1311 is an ID for each division log volume. Each ID corresponds to the numbers "0" to "N" allocated to each division log volume produced in the log volume 230. A volume usage ratio 1312 is a parameter for managing the usage ratio in each division log volume. A clearance target data ratio 1313 is a parameter that shows the ratio of transfer target data in each division log volume during the log clearance processing.

In the present invention, when data (hereinafter referred to as "new data") that is to be written over data (hereinafter referred to as "old data") existing in the log volume 230 is sent from the host computer 300, a "data addition" method is used, in which the old data in the log volume 230 is made invalid and the new data is then written to the address after the last address in use at that point in time.

More specifically, the data addition method is performed by writing the information about new data write positions (addresses immediately after the last address data had been written to before in the division log volume in use) in the entries storing information about the old data in the log volume address management table 1322. Accordingly, the amount of clearance target data in the division log volumes with previously written data greatly decreases as data overwriting increases.

The clearance target data decrease ratio 1314 is a parameter for managing the clearance target data decrease ratio in each division log volume per unit time. A clearance target flag 1315 is used for determine whether or not the division log volume clearance processing has to be started. The clearance target flag 1315 set to "ON" only when the log volume usage ratio 1312 is high and the clearance target data decrease ratio 1314 is less than a threshold value.

A clearance processing start flag 1316 is used to determine whether or not a log clearance processing command has to be issued. The clearance processing start flag 1314 ON/OFF status is determined by the "ON" ratio of the clearance target flag 1315 or the percentage of data in the entire log volume.

A user can determine, according to the usage, an optimum set threshold value for the clearance target data decrease ratio 1314, a determination threshold value for the clearance target data decrease ratio 1312 for setting the clearance target flag 1315 to "ON", and set a threshold value for setting the clearance processing start flag 1316 to "ON," by using the control software in the host computer 300.

Figure 4:
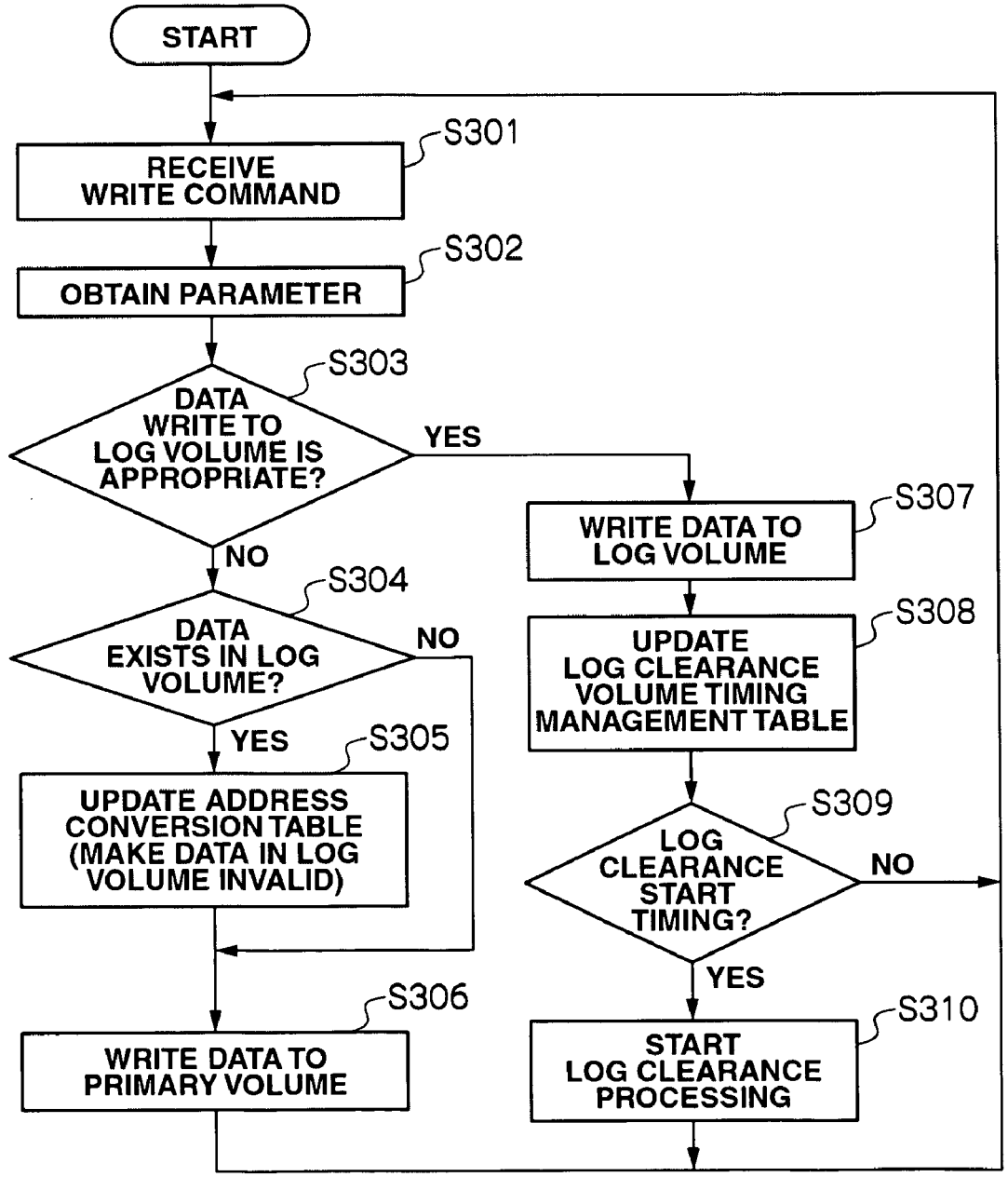
FIG. 4 is a flowchart illustrating the write command processing sequence.

FIG. 4 is a flowchart illustrating write command processing. The write command processing is started by the CPU 120 executing a program 1300 when receiving a write command. The CPU 120 in the storage control device 100 receives a write command from the host computer 300 (step S301), and obtains parameters such as an LUN, LBA, data length, and actual data (step S302).

Next, the CPU 120 determines, from the obtained parameters and the state of the log volume at that point in time, whether or not writing the data specified in the received command to the log volume is appropriate (step S303). If the CPU 120 determines in step S303 that the writing data indicated in the received command to the log volume is not appropriate, the data is written to the primary volume 220 according to the procedure of steps S304-S306. Meanwhile, if the CPU 120 determines that the writing data indicated in the received command to the log volume is appropriate, the data is written to the log volume 230 according to the procedure of steps S307-S310.

In step S303, writing data to the log volume is inappropriate when, for example, sequential write is specified in the received command; when data write to the log volume 230 has to be limited and the log volume has to be cleared because the available space in the log volume 230 has become too small; when random write is ordered in the received command but the data size is too large and the log format-writing will have no effect; or when executing the log format-writing is difficult.

(1) Operation During Data Write to Primary Volume

First, the operation during data write to the primary volume 220 will be described. When determining in step S303 that the data write to the log volume indicated in the received command is inappropriate, the CPU 120 refers to the address conversion table 1320 and checks whether or not old data that is to be overwritten with new data exists in the log volume 230 (step S304).

If old data exists in the log volume 230, the CPU 120 makes that old data invalid by making the entries for the relevant data in the log volume address management table 1322 invalid (step S305), and writes the new data to the primary volume 220 (step S306).

Meanwhile, if determining in step S304 that old data that is to be overwritten with new data does not exist in the log volume 230, the CPU 220 writes the new data to the primary volume 220 (step S306).

(2) Operation During Data Write to Log Volume

Figure 5:
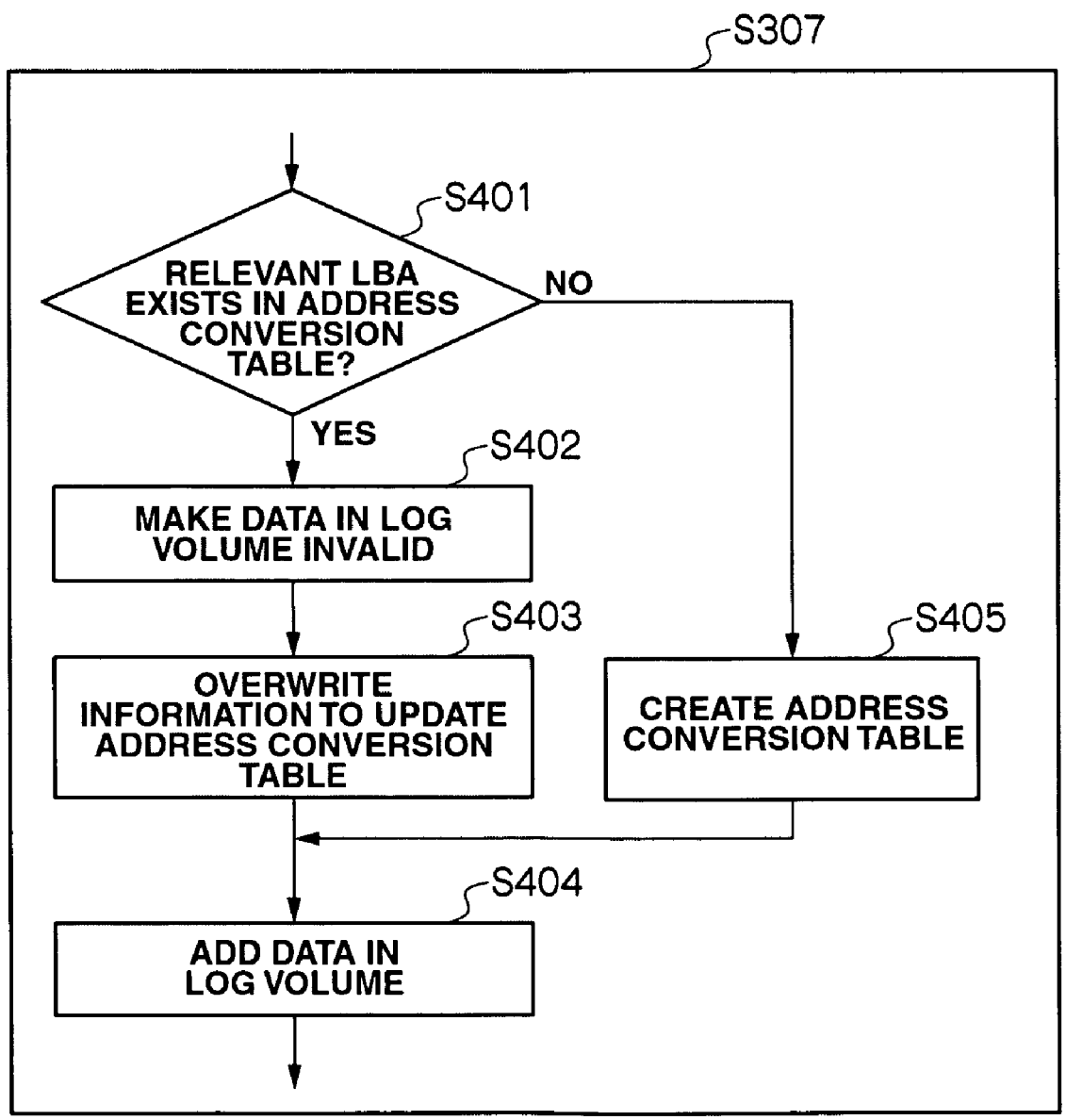
FIG. 5 is a flowchart illustrating the sequence for data write to a log volume.
Figure 6:
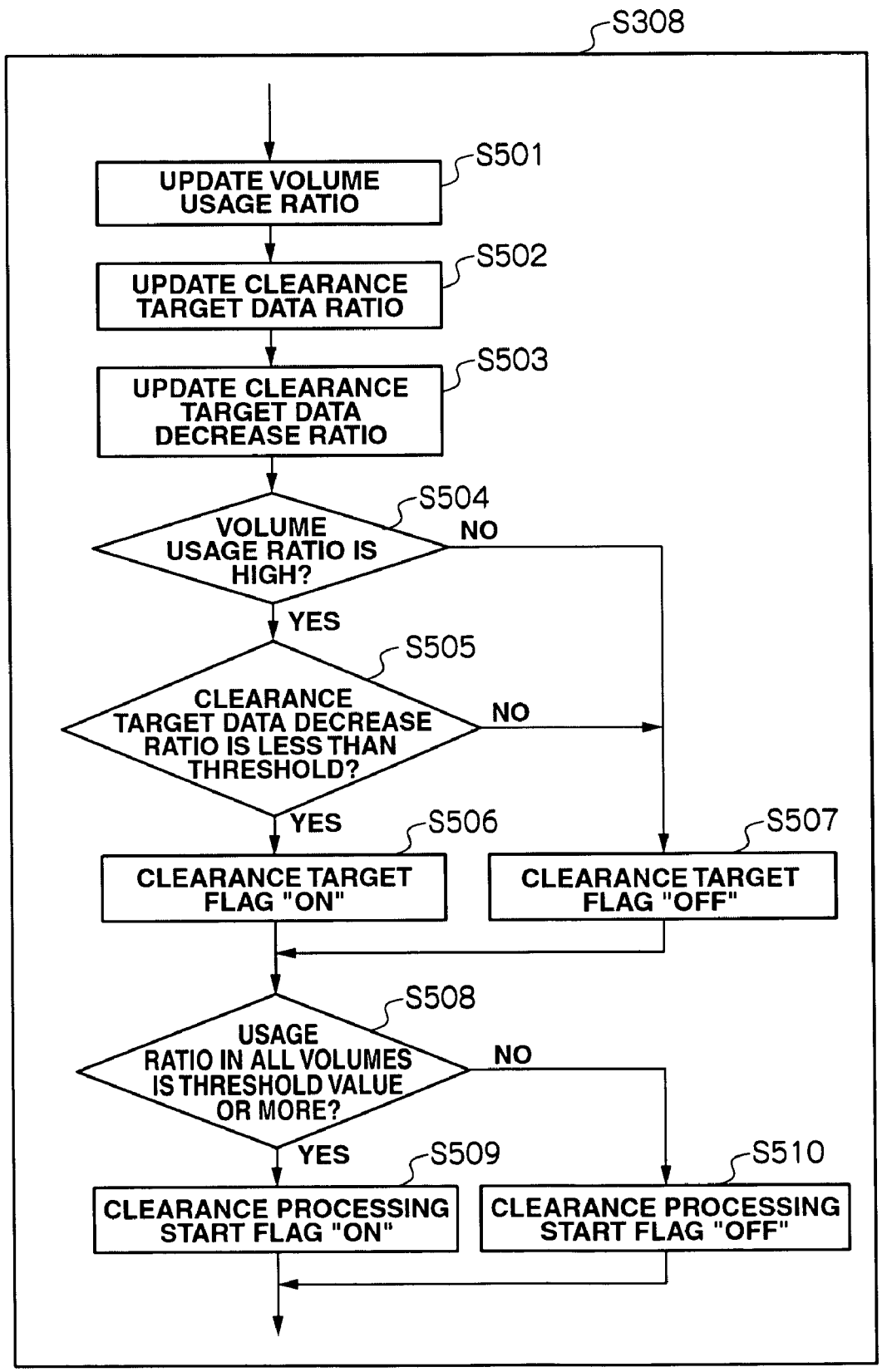
FIG. 6 is a flowchart illustrating the log clearance timing management table update sequence.

Next, the operation during data write to the log volume 230 will be described. When writing data to the log volume specified in the received command is appropriate in step S303, the CPU 120 writes the new data to the log volume (step S307: Details are illustrated in FIG. 5), and updates the log clearance timing management table 1310 (step S308: Details are illustrated in FIG. 6).

Figure 7:
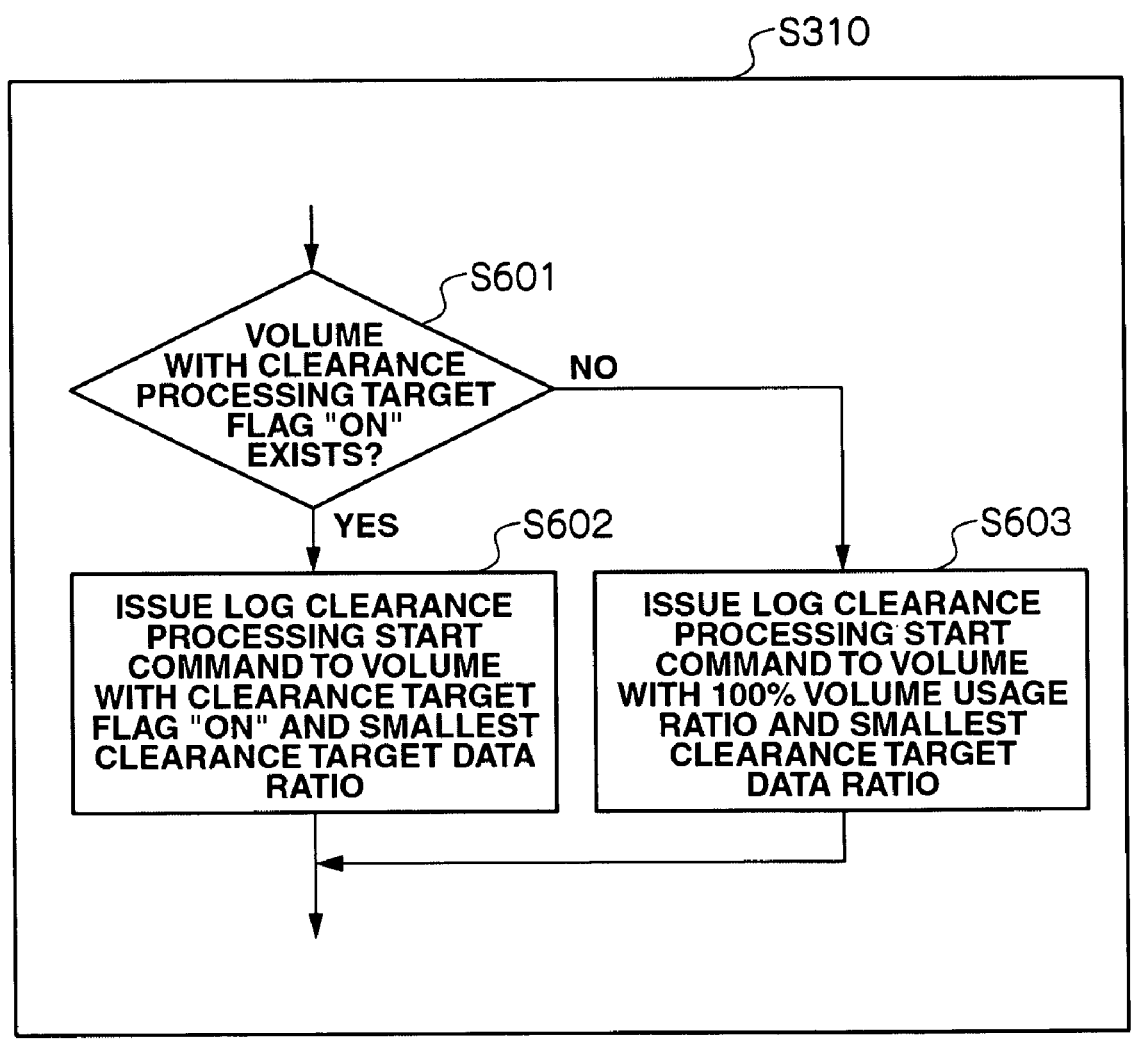
FIG. 7 is a flowchart illustrating a log clearance processing start command issue sequence.

After that, the CPU 120 determines whether or not the log clearance processing has to be started, based on information in the log clearance timing management table 1310 (step S309). When the log clearance processing has to be started, a log clearance processing start command is issued to the volume that the log clearance can be most efficiently performed on (step S310: Details are illustrated in FIG. 7), and the CPU 120 prepares for the next received write command.

Meanwhile, if determining in step S309 that the log clearance processing does not have to be started, the CPU 120 prepares for the next received write command.

(2-1) Operation During Data Write to Log Volume 230

First, the operation during data write to the log volume 230 will be described. FIG. 5 is a flowchart illustrating data write to the log volume 230. When writing data to the log volume 230, the CPU 120 checks whether or not entries for old data exist in the address conversion table 1320 (step S401).

When old data exists in the log volume 230 in step S401, the CPU 120 makes the old data existing in the log volume 230 invalid by making the entries for the relevant data in the log volume address management table 1322 invalid (step S402).

After that, the CPU 120 updates the log volume address management table 1322 so that the new data write position becomes the address after the last address in use at that point in time in the division log volume in use (step S403), and writes the new data to the position designated in the table (step S404).

On the other hand, when no old data exists in the log volume 230 in step S401, the CPU 120 creates new entries in the primary volume address management table 1321 and corresponding new entries in the log volume address management table 1322 so that the new data write position becomes the address after the last address in use at that point in time in the log volume 230 in use at that point in time (step S405), and writes the new data to the position designated in the address conversion table 1320 (step S404).

(2-2) Operation During Updating of Log Clearance Timing Management Table 1310

Next, the operation during updating of the log clearance timing management table 1310 will be described. FIG. 6 is a flowchart illustrating in detail the updating of the log clearance timing management table 1310. In steps S501, S502, and S504-S507, entries in the table for the division log volume data has been written to in step S307 are updated. In steps S503 and S508, entries in the table for all division log volumes are updated.

After writing data to a division log volume in step S307, the CPU 120 updates the entries in the columns for the volume usage ratio 1312 (step S501) and clearance target data ratio 1313 (step S502) for the division log volume the data has been written to.

Next, the CPU 120 updates the clearance target data decrease ratios 1314 in all division log volumes (step S503) and goes on to step S504. The clearance target data decrease ratio is updated by calculating the clearance target data decrease ratio per unit time for all division log volumes.

Subsequently, the CPU 120 checks whether or not the value of the volume usage ratio 1312 in the volume the data has been written to is high (step S504). If the value in the relevant volume is sufficiently high, the CPU 120 goes on to step S505. "The value of the volume usage ratio 1312 being sufficiently high" means that the value is 100%, 90% or more, or higher than a predetermined value.

If the value of the volume usage ratio 1312 is sufficiently high in step S504, the CPU 120 checks whether or not the clearance target data decrease ratio 1314 is less than a threshold value (step S505). If the clearance target data decrease ratio 1314 is less than the threshold value in step S505, the CPU 120 sets the clearance target flag 1315 to "ON" (step S506) and goes on to step S508.

Meanwhile, if the value of the volume usage ratio 1312 is still low in step S504, or the clearance target data decrease ratio 1314 is not less than the threshold value in step S505, the CPU 120 sets the clearance target flag 1315 to "OFF" (step S507) and goes on to step S508.

Next, the CPU 120 calculates the usage ratio for the entire log volume 230 (step S508). If the usage ratio in the entire log volume is the threshold value or more, the CPU 120 sets the clearance processing start flag 1316 to "ON" (step S509) and ends the processing for updating the log clearance timing management table 1310 (step S308).

Meanwhile, if the usage ratio in the entire log volume is less than the threshold value in step S508, the CPU 120 sets the clearance processing start flag 1316 to "OFF" (step S510), and ends the processing for updating the log clearance timing management table 1310 (step S308).

(2-3) Operation in Determination of Log Clearance Start

When the clearance processing start flag 1316 is "ON," the CPU 120 starts the log clearance processing (step S309).

(2-4) Operation During Log Clearance Processing Start

Next, the operation after starting the log clearance processing will be described. FIG. 7 is a flowchart illustrating in detail the start of the log clearance processing. When deciding to start the log clearance processing in step S309, the CPU 120 checks whether or not there is any volume with the clearance target flag 1315 "ON" (step S601). If there is any volume with the clearance target flag 1315 "ON" in step S601, the CPU 120 issues a log clearance processing start command to the volume with the clearance target flag 1315 "ON" and having the smallest clearance target data ratio 1313, and clears the relevant division log volume and the corresponding entries in the address conversion table 1320 (step S602).

Meanwhile, sometimes there is no volume with the clearance target flag 1315 "ON" in step S601 because the clearance data decrease ratio 1314 in all division log volumes is the threshold value or more. In that case, the CPU 120 issues a log clearance processing start command to the volume with a 100% volume usage ratio 1312 and the smallest clearance target data ratio 1313, and clears the relevant division log volume and the corresponding entries in the address conversion table 1320 (step S603).

The division log volume and corresponding entries in the address conversion table 1320 are cleared by transferring data stored in the log volume to the address position shown in the entries in the primary volume address management table 1321 corresponding to those in the log volume address management table 1322, and clearing the entries that have managed the clearance target data addresses in the primary volume address management table 1321 and log volume address management table 1322.

In this way, in the storage system 1, a log clearance processing start command is issued to the volume with the smallest clearance target data ratio 1313, the relevant division log volume and the relevant entries in the address conversion table 1320 are cleared, and the data stored in the log volume 230 is transferred to the primary volume 220.

Accordingly, the amount of discontinuous data and processing time during random write to the primary volume 220 that always becomes necessary when clearing the log volume 230 can be reduced, and therefore, processing efficiency in log format-writing can be improved.

Moreover, in the storage system 1, the clearance target flag 1315 is set to "ON" when the value of the volume usage ratio 1312 in a volume data has been written to is high and the clearance target data decrease ratio 1314 is less than the threshold value. A log clearance processing start command is issued to the volume having the clearance target flag 1315 "ON" and the smallest clearance target data ratio 1313, and the relevant division log volume and address conversion table 1320 are cleared. Accordingly, the most appropriate log volume can be cleared, and the processing efficiency in the log format-writing can be improved.

Moreover, in the storage system 1, when there is no volume with the clearance target flag 1315 "ON," a log clearance processing start command is issued to the volume with a 100% volume usage ratio 1312 and the smallest clearance target data ratio 1313, and the relevant division log volume and entries in the address conversion table 1320 are cleared. Accordingly, the most appropriate division log volume can be cleared even when there is no volume with the clearance target flag 1315 "ON".

Moreover, when data is stored in a log volume 230 in the storage system 1 and one division log volume is already filled with data at that point in time, the data is stored in the next division log volume. Accordingly, the division log volume filled with data can be cleared, and the processing efficiency in the log format-writing can be further improved.

Moreover, in the storage system 1, the volume usage ratio in the entire log volume 230 is calculated. If the entire log volume usage ratio are the threshold value or more, the clearance processing start flag 1316 is set to "ON," and a log clearance processing start command is issued to the volume with the clearance target flag 1315 "ON" and the smallest clearance target data ratio 1313, and the relevant division log volume and corresponding entries in the address conversion table 1320 are cleared. Accordingly, when the capacity of the log volume 230 remains sufficient, no division log volume clearance is performed, and unnecessary processing can be effectively prevented.

Moreover, in the storage system 1, the new data write position (addresses immediately after the last address of a division log volume in use at that point in time) is written over entries for old data in the log volume address management table 1322. Accordingly, the amount of the clearance target data in a division log volume data has been previously written in is greatly reduced as the data that is to be overwritten to the old data increases.

The present invention can apply to various storage systems that perform log format-writing by address-converting discontinuous data into continuous data.

We claim:

1. A control method for a storage device having a first volume for storing discontinuous data transmitted from a host computer and a second volume for storing continuous data produced by address-converting the discontinuous data, the method comprising:
    a first step of converting the discontinuous data transmitted from the host computer into continuous data and storing the continuous data in one of a plurality of third volumes formed by dividing up the second volume;
    a second step of managing, from among the continuous data stored in the third volumes in the first step, transfer target data that has to be transferred from a third volume to the first volume; and
    a third step of transferring transfer target data stored in the third volume having the smallest amount of the transfer target data managed by the data management unit to the first volume, thereby clearing the third volume.

2. The control method for a storage device according to claim 1, wherein in the first step, the amount of the stored continuous data and the amount of decrease in the transfer target data per unit time in each of the third volumes are managed, and the third volume in which the stored continuous data amount is a predetermined threshold value or more and in which the transfer target data decrease amount is less than a predetermined threshold value is managed as a clearance target third volume, and in the third step, from among the clearance target third volumes managed in the first step, the third volume having the smallest amount of the transfer target data is cleared.

3. The control method for a storage device according to claim 2, wherein the third volume filled with continuous data and having the smallest transfer target data amount is cleared in the third step when no clearance target third volume is managed in the first step.

4. The control method for a storage device according to claim 1, wherein in the first step, the stored continuous data amount in each third volume is managed, and when one of the third volumes is filled with continuous data, continuous data is stored to another third volume in the second step.

5. The control method for a storage device according to claim 1, wherein in the first step, the stored continuous data amount in of the entire plurality of third volumes is managed, and when the stored continuous data amount in the entire plurality of third volumes is a predetermined threshold value or more, the third volume having the smallest amount of the transfer target data managed in the first step is cleared in the third step.

6. The control method for a storage device according to claim 1, wherein when data that is to be written over existing data stored in the third volumes is transmitted from the host computer, the existing data is made invalid and the data to be written is stored in the address in the third volumes in the second step.

7. A storage device having a first volume for storing discontinuous data transmitted from a host computer and a second volume for storing continuous data produced by address-converting the discontinuous data, the storage device comprising:
    a data storage unit for converting the discontinuous data transmitted from the host computer into the continuous data and storing the continuous data in one of a plurality of third volumes formed by dividing up the second volume;
    a data management unit for managing, from among the continuous data stored in the third volumes by the data storing unit, transfer target data that has to be transferred from one of the third volumes to the first volume; and
    a volume clearance unit for transferring transfer target data stored in the third volume having the smallest amount of transfer target data managed by the data management unit to the first volume, thereby clearing the third volume.

8. The storage device according to claim 7, wherein the data management unit manages the amount of the stored continuous data and the amount of decrease in the transfer target data per unit time in each of the third volumes, and manages, as a clearance target third volume, a third volume in which the stored continuous data amount is a predetermined threshold value or more and in which the transfer target data decrease amount per unit time is less than a predetermined threshold value, and the volume clearance unit clears the third volume having the smallest amount of the transfer target data among the clearance target third volumes managed by the data management unit.

9. The storage device according to claim 8, wherein the volume clearance unit clears the third volume filled with the continuous data and having the smallest transfer target data amount when the data management unit manages no clearance target third volume.

10. The storage device according to claim 7, wherein the data management unit manages a stored continuous data amount in each third volume, and when one of the third volumes is filled with continuous data, the data storage unit stores continuous data in another third volume.

11. The storage device according to claim 7, wherein the data management unit manages the stored continuous data amount in the entire plurality of third volumes, and when the stored continuous data amount in the entire plurality of third volumes reaches a predetermined threshold value or more, the volume clearance unit clears the third volume having the smallest amount of transfer target data managed by the data management unit.

12. The storage device according to claim 7, wherein when data that is to be written over existing data stored in the third volumes is transmitted from the host computer, the data storage unit makes the existing data invalid and stores the data to be written in the address after the last address in the third volumes.

* * * * *